Jan. 3, 1950          J. O. FOWLER          2,493,664
PROCESS FOR HEAT-TREATING MILK AND CREAM
Filed March 26, 1947          3 Sheets-Sheet 1
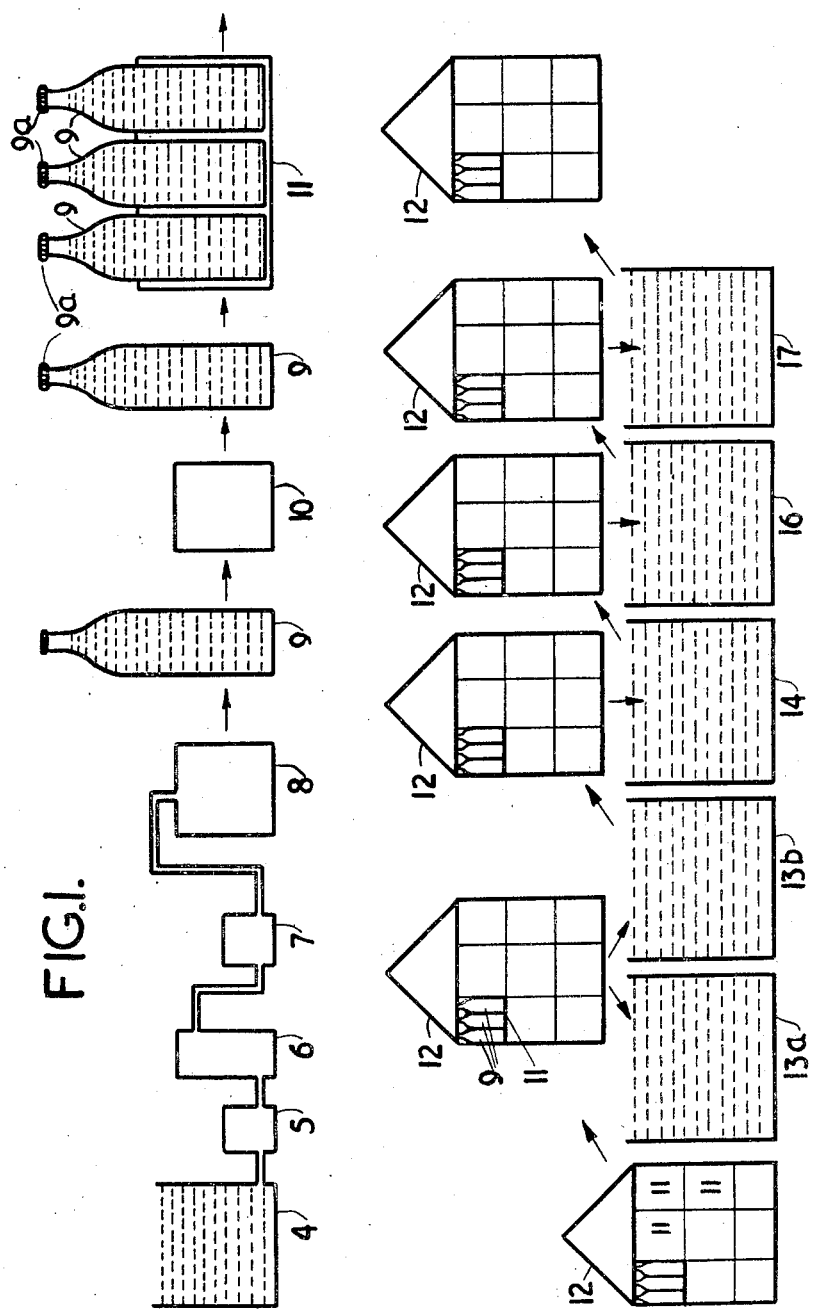
INVENTOR
JAMES O. FOWLER
BY Marshall & Marshall
ATTORNEYS

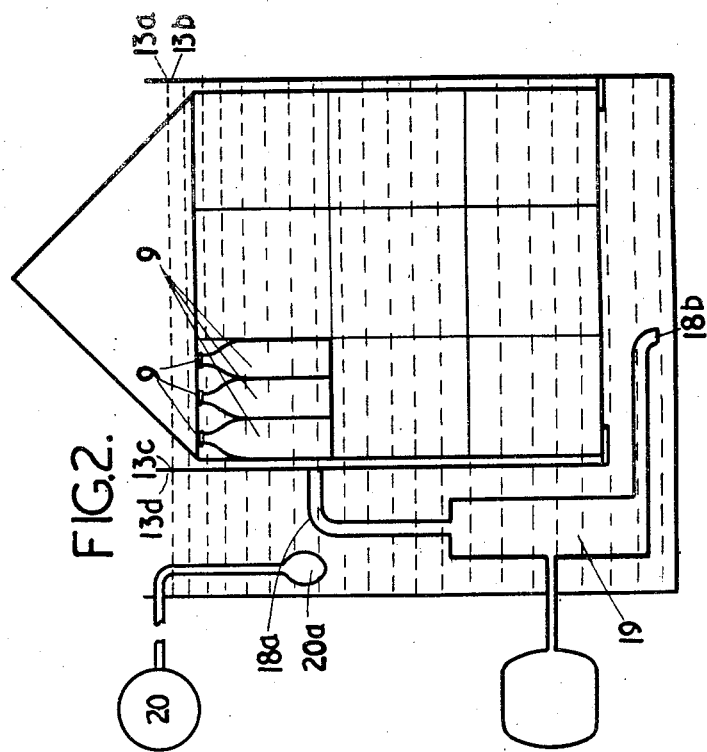

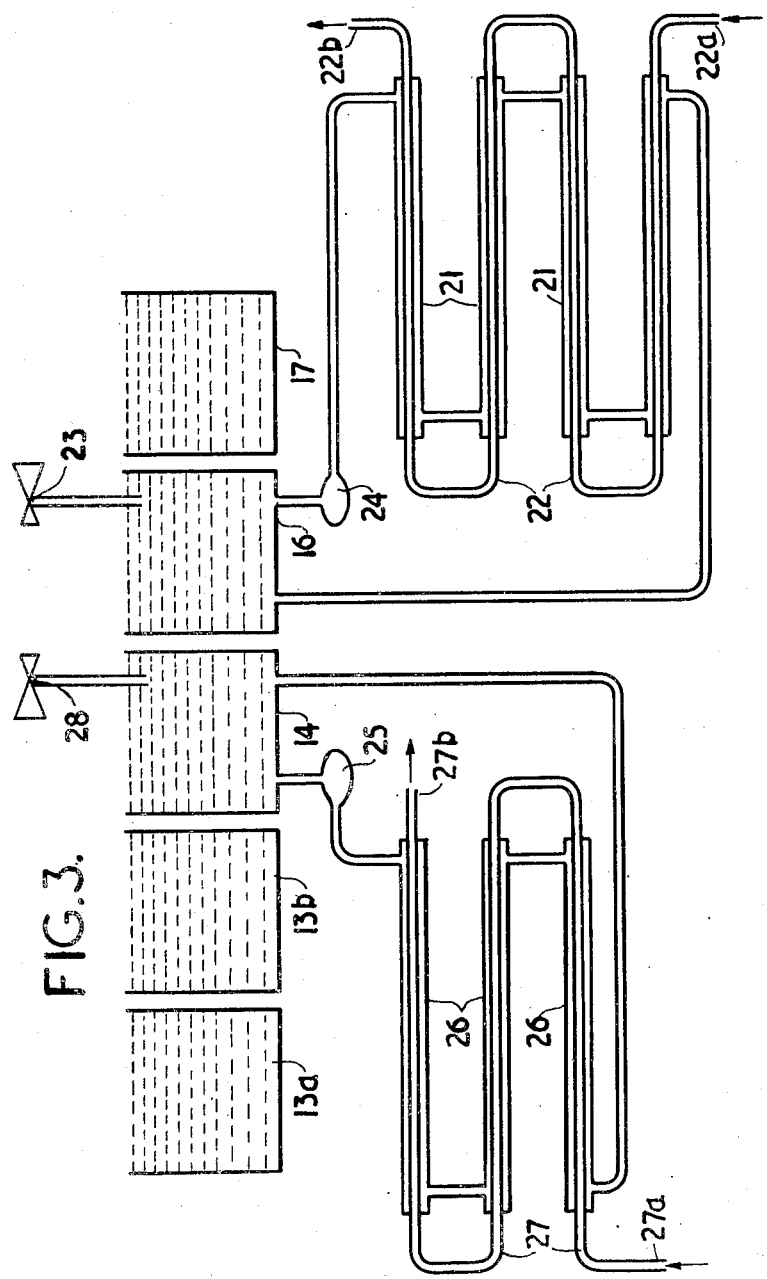

Patented Jan. 3, 1950

2,493,664

UNITED STATES PATENT OFFICE 2,493,664

PROCESS FOR HEAT-TREATING MILK AND CREAM

James O. Fowler, Sparkhill, Birmingham, England

Application March 26, 1947, Serial No. 737,260
In Great Britain April 11, 1946

3 Claims. (Cl. 99—214)

This invention has reference to a new or improved process for heat treating milk and cream and has for its object to improve the process described and claimed in the specification of my pending U. S. application Serial No. 637,061 filed on December 22, 1945.

According to the present invention the process for the heat treatment of lacteal fluids resides in filling the fluid either cold or after a preliminary heating in bulk into bottles, capping the filled bottles, assembling a plurality of filled and capped bottles into a batch and subjecting each such batch individually and successively by intermittent step by step progression firstly to heat treatment by complete immersion for a prescribed period of time in a vessel containing a heated liquid preferably hot water maintained at a prescribed temperature, then to removal from the vessel in which heat treatment takes place and to submission to an initial cooling of relatively short duration by immersion in a liquid preferably water, the temperature of which is somewhat below the temperature at which heat treatment is effected but considerably above the temperature of subsequent main cooling said initial cooling affording an opportunity for the conditioning of the walls of the bottles prior to the main cooling and subsequently to cooling by immersion for a prescribed period or successive periods of time in a liquid preferably water maintained at a prescribed temperature.

Figure 1 is a diagrammatic representation illustrative of the method of carrying the invention into effect.

Figure 2 is a diagrammatic representation of a modified form of tank which may be utilised for heat treatment purposes in connection with the method illustrated in Figure 1.

Figure 3 is a diagrammatic representation of a heat exchanger arrangement for use in conjunction with the process illustrated in Figure 1.

In the drawings like numerals of reference indicate similar parts in the several views.

Dealing first with Figure 1.

The raw milk as received is emptied into the tank 4 from which it is forced by a pump 5 through a filter 6 of known construction.

The filtered milk is then passed by a float controlled constant level vessel 7 to the supply tank of a bottling plant of the vacuum filler type of known construction indicated by the reference numeral 8.

In this bottling plant 8 the bottles 9 are filled to a level which allows for expansion during the heat treatment. After filling the bottles 9 are passed to a capping machine of known kind which is denoted by the reference numeral 10 and which caps the bottles with caps 9a conveniently of the kind known in commerce as "crown" seals.

After sealing the bottles 9 are placed in partitioned crates of known kind and a number of crates constituting a batch, say 27, are then placed in a cradle 12.

At the appointed time this cradle 12 is hoisted by an electric winch and subsequently lowered into and immersed in one or other of the tanks 13a, 13b containing water which is heated to a temperature of 150° F.–155° F.

The electric winch, not shown, incorporates a two speed gear which permits immersion to take place slowly.

The capped bottles 9 and contents are held in one or other of the tanks 13a, 13b at the temperature aforesaid for a period of 30–35 minutes after which a cradle 12 with its load of bottles is removed from the tank 13a or 13b and is lowered into a cooling tank 14 containing water at a temperature of 110°–120° F. preferably 115° F. where the bottles are held for a period of 5–10 minutes.

The degree of cooling thus effected produces a cooling effect on the structure of the bottles 9 which allows of the outer layers of the bottle walls contracting before the inner layers and thus minimizes the risk of fracture of the bottles due to too rapid cooling.

Further this initial cooling prevents the formation of a skin on the surface of the milk in a bottle 9 and so eliminates the possibility of impairing the taste of the treated milk which would otherwise obtain if this formation of skin was allowed to take place.

After immersion in the preliminary cooling tank 14 for the period stated the loaded cradles 12 are transferred by means of the electric winch to a cooling tank 16 where the bottles remain immersed for twenty minutes in water at a temperature of 75°–85° F. At the end of this time the cradles 12 and bottles 9 are transferred to the chilling tank 17 containing water at a temperature of 40°–50° F. The bottles are maintained in this chilling tank 17 for a period of 15 minutes after which they are removed and are ready for transfer for sale or storage.

As is illustrated in Figure 2 a holding tank 13a, 13b in which heat treatment is effected is provided adjacent to one end with a baffle 13c and disposed within the space 13d between the said baffle 13c and the presented end of a tank 13a, 13b are the inlet and outlet pipes 18a, 18b respectively which are associated with the circulating pump 19.

The inlet orifice of the inlet pipe 18a is arranged to open into a tank 13a, 13b slightly below the surface level of the water in a tank 13a, 13b when there are no crates immersed therein whilst the outlet pipe 18b is arranged with part of its length parallel to the bottom of a tank and with its outlet orifice located about three inches above the bottom of a tank.

During the holding period in a tank 13a, 13b the respective pump 19 is brought into operation so that hot water is drawn from the higher levels and transferred to the bottom levels where the discharged water passes along the bottom of a tank 13a, 13b and subsequently diffuses upwardly towards the higher levels thus providing for a continuous circulation of water around the bottles 9 and so making for a uniform treatment of all the bottles and contents in any one batch.

The discharge of the water on to the bottom of a tank 13a, 13b by the circulating pump 19 also prevents the formation of scum on the surface of the water and which would otherwise be liable to cling to the bottles as they are removed.

It will be appreciated that the baffle 13c prevents damage to the inlet and outlet pipes 18a, 18b and to the bulbs 20a of the visible indicating and recording instruments 20 during the placing of or removal of bottles in or from a tank 13a, 13b.

It will be appreciated also that a pump 19 may be used for filling and emptying a tank 13a, 13b and for removing surplus water and passing it to a storage vessel for re-use if required.

Conveniently the milk is preferably preheated in the supply tank of the bottling machine 8 and preferably as shown in Figure 3 this is done by a heat exchanger in which water from the tank 16 is passed through a jacket 21 which is located around a coil 22 from which filtered milk is circulated into the inlet end 22a of the coil 22 and after traversing the said coil 22 is passed from the outlet end 22b to the supply tank of the bottling machine 8.

The tank 16 is also provided with a thermostatic valve 23 for admitting water to balance the temperature in the said tank 16.

The water is circulated through the jacket 21 of the heat exchanger by a pump 24 and it is found that by circulating through the coil 22 milk received at a temperature of 42° F. the milk fed to the supply tank of the bottling machine 8 is heated to a temperature of 62° F.

Similarly the tank 14 may be adapted by heat exchange to provide warm water for bottle washing for which purpose water from the tank 14 is circulated by a pump 25 through a jacket 26 containing a coil 27 into which water from the town mains enters at the inlet end 27a at say a temperature of 55° F. and leaves at the outlet end 27b at a temperature of 85° F.

The tank 14 is provided with a thermostatic steam valve 28 for the admission of balancing steam.

It will be appreciated that in accordance with the present invention also there is no possibility of contamination after bottling and that the subsequent process enables heat treatment to be carried out efficiently without risk of fracture of the bottles or the formation of skin on the surface of the milk after treatment.

It will be appreciated further that the invention is not limited to treatment at the temperatures or for the periods stated as these may be varied as may be required and that the process may be applied also to the heat treatment of cream which previously has been separated from milk.

I claim:

1. A process for the heat treatment of lacteal fluids, comprising, filling bottles with the fluid to be treated, capping the bottles with liquid proof caps, assembling a plurality of filled and capped bottles as a separate batch, immersing each such batch individually and successively by intermittent step by step progression into each of a plurality of separate water baths, and maintaining each batch substantially motionless in each bath during the period of immersion therein, each of said baths being maintained at a substantially constant temperature, the first of said baths being a pasteurizing bath, and at least two successively lower temperature baths for pre-cooling and cooling said bottles and the fluid, the first of the two cooling baths having a temperature of from about 35° to about 45° F. below that of the pasteurizing bath and the second having a substantially lower temperature.

2. A process for the treatment of lacteal fluids by heating to a pasteurizing temperature for a period of time necessary to destroy bacteria and then cooling to storage temperatures that is characterized by the steps of filling containers with untreated fluid, capping the containers with liquid proof caps, assembling the capped containers in batches and subjecting each batch successively in intermittent step by step progression to a predetermined series of immersions in separate liquid baths, each of the baths being maintained at a substantially constant temperature, the baths being successively at pasteurizing temperature, pre-cooling temperature and cooling temperature, each batch being held substantially motionless relative to each bath, whereby the heat exchange between the fluid containers and the liquid in each separate bath is effected principally by conduction and the shock to the containers thus kept within limits to obviate breakage.

3. A process for the treatment of lacteal fluids by heating to pasteurizing temperature for a period of time necessary to destroy bacteria and then cooling to storage temperature by separate cooling steps that is characterized by the steps of filling glass containers with untreated fluid, capping the containers with liquid-tight caps, assembling a group of filled, capped containers in a batch and subjecting each batch, as a unit, in intermittent step by step progression, to total immersion successively in separate individual water baths, each bath being distinct and maintained at a substantially constant temperature, the baths being first, a pasteurizing bath having a temperature of about 150° F. in which each batch is immersed for a period of time sufficient to effect pasteurization, second a pre-cooling bath having a temperature of about 115° F., third a cooling bath having a temperature of about 80° F. and finally a chill bath having a temperature of about 45° F., each batch being retained substantially motionless in each of the cooling baths for a period of time necessary to effect heat exchange by conduction to substantially equalize the temperatures of the bath, containers and fluid and then being moved to a successive bath.

J. O. FOWLER.

REFERENCES CITED

The following references are of record in the file of this patent:

UNITED STATES PATENTS

| Number | Name | Date |
|---|---|---|
| 727,575 | Birkholz | May 12, 1903 |
| 749,547 | Fesenmeier | Jan. 12, 1904 |
| 1,004,885 | Loew | Oct. 3, 1911 |
| 1,005,854 | Lindemann et al. | Oct. 17, 1911 |
| 1,077,270 | Gettelman | Nov. 4, 1913 |
| 1,227,101 | Wehmiller | May 22, 1917 |
| 2,282,187 | Herold et al. | May 5, 1942 |